(No Model.) 2 Sheets—Sheet 2.

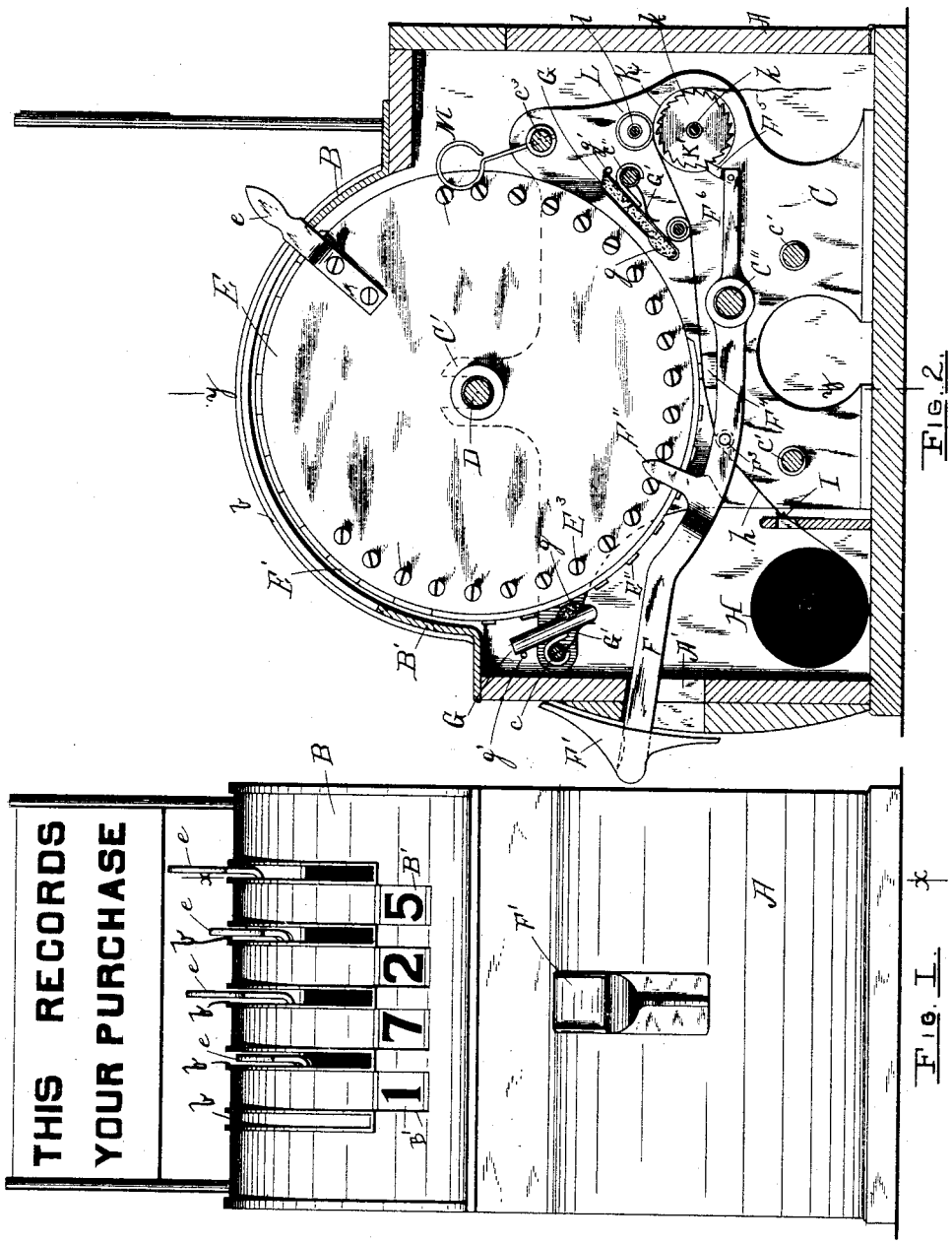

J. F. GOODRIDGE.
CASH INDICATOR AND REGISTER.

No. 446,343. Patented Feb. 10, 1891.

WITNESSES
Irving H. Fay.
Alice A. Perkins

INVENTOR
James F. Goodridge
Per Alban Andrew
ATTORNEY

UNITED STATES PATENT OFFICE.

JAMES F. GOODRIDGE, OF BOSTON, MASSACHUSETTS.

CASH INDICATOR AND REGISTER.

SPECIFICATION forming part of Letters Patent No. 446,343, dated February 10, 1891.

Application filed July 10, 1890. Serial No. 358,238. (No model.)

*To all whom it may concern:*

Be it known that I, JAMES F. GOORIDGE, a citizen of the United States, and a resident of Boston, in the county of Suffolk and State of Massachusetts, have invented new and useful Improvements in Cash Indicators and Registers, of which the following, taken in connection with the accompanying drawings, is a specification.

This invention relates to improvements in cash indicators and registers; and it is carried out as follows, reference being had to the accompanying drawings, wherein—

Figure 4:
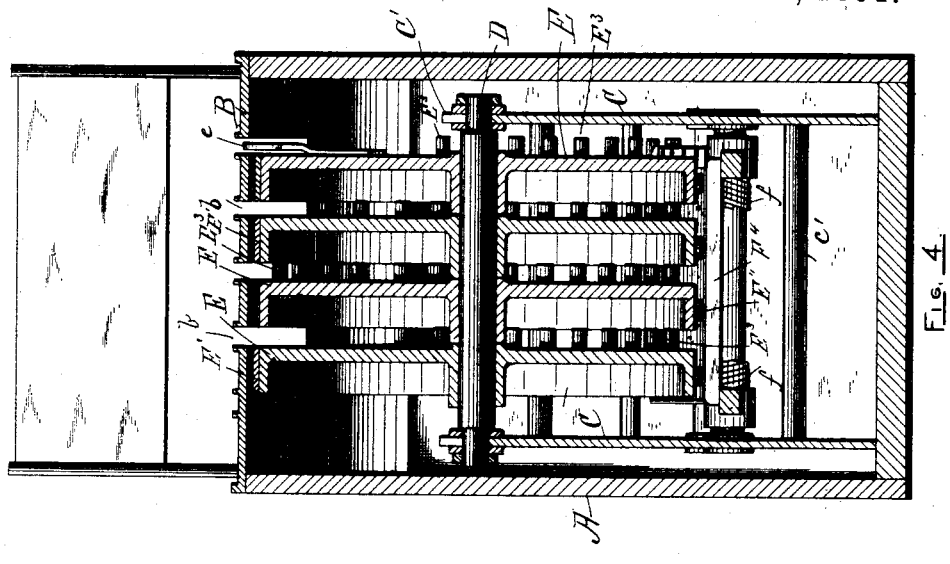
Figure 5:
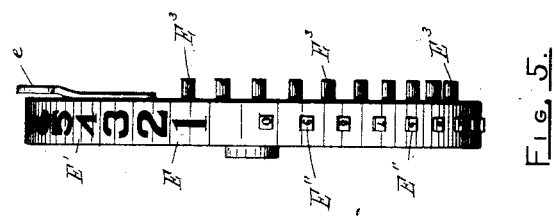
Figure 3:
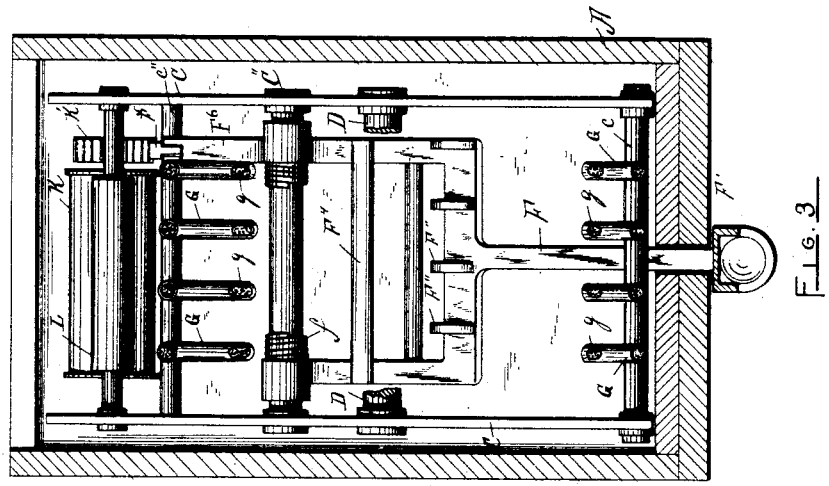

Figure 1 represents a front elevation of the invention. Fig. 2 represents a vertical section of the same on the line X X shown in Fig. 1. Fig. 3 represents a plan view showing the case in section and the type-wheel removed. Fig. 4 represents a cross-section on the line Y Y, shown in Fig. 2; and Fig. 5 represents a detail end elevation of one of the type-wheels.

Similar letters refer to similar parts wherever they occur on the different parts of the drawings.

A represents a case in which the mechanism is contained, which case is open at its top, and there provided with a removable arched cover B, as shown in Figs. 1, 2, and 4. Within the case A is secured in a suitable manner the frames C C, which are held at a proper distance apart by means of stay bolts or rods $c$, $c'$, $c'$, $c''$, and $c^3$, or equivalent devices. The upper ends of the frames C C are preferably forked, as shown at $C'$ $C'$ in Figs. 2 and 4, and to such forked portions of said frames is secured in a suitable manner the type-wheel shaft D, upon which are loosely journaled side by side a series of type-wheels E E, as shown in Figs. 2 and 4. In practice I prefer to use four such type-wheels in each cash indicator and register; but more or less may be used according to the amounts that are to be indicated and registered.

Each type-wheel is provided with a radial handle $e$, projecting through a slot $b$ in the cover B, as shown in Figs. 1, 2, and 4, by means of which each of the said type-wheels can be turned around its axis independently of the others in the series. Each type-wheel has on a portion of its periphery ten numerical indicators $E'$ $E'$, (marked, respectively, 1, 2, 3, 4, 5, 6, 7, 8, 9, and 0,) and in front of each type-wheel is made a sight-opening $B'$ through the cover B, which opening is large enough to permit one of said numerals to be seen during the adjustment of the type-wheel corresponding to such sight-opening. In addition to such indicators, each type-wheel has on a portion of its periphery a corresponding series of numerical types $E''$ $E''$, preferably made of rubber and marked 1, 2, 3, 4, 5, 6, 7, 8, 9, and 0, as shown in Figs. 2 and 5.

On one side of each type-wheel is arranged a number of locking pins, teeth, or projections $E^3$ $E^3$, (shown in Figs. 2, 4, and 5,) and in connection with the same I use a yoke-shaped locking-lever F, common to all the type-wheels in the series, which lever is pivoted, preferably, on a rod $C''$, secured to the frame C C, as shown in Figs. 2, 3, and 4. The forward end of said yoke-lever F projects through a vertical slot $A'$ in the front of the case A, which slot is preferably concealed by a shield $F'$, attached to or forming a part of the outer end of said yoke-lever F, as shown in Figs. 1, 2, and 3. The said yoke-lever F is normally held in its upper position by the influence of a spring, springs, or equivalent devices. In practice I prefer to do this by means of coiled springs $f\,f$, surrounding the rod $C''$, each such spring having its ends secured, respectively, to said lever and rod. The lever F has on its upper side a number of locking-teeth $F''$ $F''$, one for each type-wheel, adapted to enter between any two successive pins $E^3$ $E^3$ on the respective type-wheels when the lever F is released, thus holding said wheels locked in their respective positions, as shown in Fig. 2.

The types $E''$ are inked by suitable inking devices. In the drawings I have represented the inking devices as composed of tubes or cases G G, pivoted on the rods $c\ c''$, and containing ink-charged pads $g\ g$, held against the type $E''$ by means of springs $G'\ G'$, preferably secured to the respective rods $c\ c''$, and having their free ends pressing against the under side of the respective ink-cases G G, as shown in Figs. 2 and 3. Stationary stop pins or projections $g'\ g'$ serve to limit the motion of said ink-cases G G, for the purpose of preventing the inking-pads $g\ g$ from touching the spaces on the type-wheels between the types, as shown in Fig. 2.

In connection with the type-wheels and ink devices I use a paper ribbon and printing device which is constructed as follows:

H is a paper reel, and $h$ is the paper ribbon or sheet leading from it between a suitable tension device I, of any well-known form. From between the said tension device the paper ribbon passes over a bar or guide roller $F^3$, preferably journaled or arranged on the lever F, and from said guide it passes over a platen pressure-bar $F^4$, secured to the upper side of the lever F, as shown in Figs. 2, 3, and 4, and at this place the ribbon is printed by being pressed by said platen pressure-bar against the types on said type-wheels, which for the time being are held opposite to the platen pressure-bar, such types corresponding in value to the indicators, which are in sight back of the sight-openings B' B'. After being printed the paper ribbon $h$ is guided to and between a pair of feed-rollers K and L, mounted on the respective spindles $k$ and $l$, as shown in Figs. 2 and 3. The said rollers are preferably rubber-faced. The roller K has an intermittent rotary feed-motion imparted to it from the lever F, and the roller L is loose, so as to follow and partake of the motion of the roller K.

The roller K is intermittently rotated as follows: To the roller K is secured a ratchet-wheel K', which is actuated by a spring-pressed pawl $F^5$, pivoted to a rear extension $F^6$ on the lever F, as shown in Figs. 2 and 3. From between the feed-rollers K and L the printed paper ribbon drops into the lower rear end of the case A, where the printed portion may be detached at the close of business for any desired length of time.

M is a yielding spring pawl-wire (one for each of the wheels E) preferably secured to the post $c^3$ and having its upper looped or bent end adapted to press against and between any two of the wheel-pins $E^3$ $E^3$ for the purpose of holding said wheels in their proper positions relative to the values shown through the sight-openings and printed on the ribbon during the indication and registration of such values.

The operation of this my improved cash indicator and register is as follows: When it is desired to indicate and register any sale that is being made, it is only necessary with one hand to depress the lever F, causing the projections F'' F'' to be disengaged from between the pins $E^3$ $E^3$ on all the type-wheels E at or about the same time as the type-wheels are liberated. The paper ribbon is released from between the platen pressure-bar $F^4$ and the type opposite to it, and while being so released it is fed forward the proper distance by the upward motion of the pawl $F^5$ acting on the ratchet-wheel K'. While the lever F is thus held depressed and the type-wheels released, the latter may be turned forward or back and adjusted until the value of the sale that is being made is shown through the sight-openings B' B'. The operator now lets go the lever F, which is moved to its normal upper position by the influence of the springs $f f$, as shown in Fig. 2, and when such position of the said lever is reached the paper ribbon is compressed between the platen pressure-bar $F^4$ and the type opposite to it, by which figures corresponding to those shown by the indicators through sight-openings B' are automatically marked, printed, or registered on the ribbon at the same time as the projections F'' on the lever F are caused to enter spaces between corresponding pins $E^3$ $E^3$ on the respective wheels E E, thus locking and holding them in their last registered positions until again released by the depression of the lever F when it is desired to indicate and register another sale, and so on.

Having thus fully described the nature, construction, and operation of my invention, I wish to secure by Letters Patent, and claim—

1. In a cash indicator and register, the combination of an independently-adjustable indicator and type wheel having locking pins or projections, a swinging locking-lever adapted to move independent of any motion of the wheel and having an attached ribbon-pressing platen and a locking-tooth, which latter normally stands in engagement with a pair of the locking-pins, and inking device and ribbon-feeding mechanism actuated by the locking-lever when the latter is swung to move its locking-tooth and platen away from the periphery of the type-wheel, substantially as described.

2. In a cash indicator and register, the combination of an independently-adjustable indicator and type wheel having a handle for turning it and provided with lateral locking pins or projections, a pivoted wheel-locking lever adapted to swing independent of any motion of the type-wheel and having at one side of its pivot a ribbon-pressing platen and a locking-tooth, which latter normally stands in engagement with a pair of the locking-pins until the lever is depressed to move the platen and tooth in a direction away from the periphery of the type-wheel, an inking device, and ribbon-feeding mechanism, substantially as described.

3. In a cash indicator and register, the combination of a case having an arched slotted cover, a series of independently-adjustable indicator and type wheels, each having locking-pins, and a handle for each wheel extending through the arched cover for turning the wheel, a swinging yoke-lever adapted to move independent of any motion of the type-wheels and having a ribbon-pressing platen and a series of locking-teeth, which latter normally stand in engagement with the locking-pins until the lever is depressed to move its platen away from the type-wheel, an inking device, and ribbon-feeding mechanism, substantially as described.

4. In a cash indicator and register, the combination of a series of indicator and type wheels, each having lateral locking pins or projections and a handle by which to turn it, a pivoted lever adapted to swing independent of any motion of the indicator and type wheels, and having a series of locking-teeth which normally engage the locking pins or projections on the wheels and carrying a platen or pressure-bar to press a ribbon against the wheels, inking devices, and ribbon-feeding mechanism, substantially as described.

5. In a cash indicator and register, the combination of a series of indicator and type wheels, each having a handle by which to turn it, inking devices, ribbon-feeding rolls, one of which is provided with a ratchet-wheel, and a pivoted wheel-locking lever adapted to swing independent of any movement of the indicator and type-carrying wheels, having at one side of its pivot a pawl to engage the ratchet-wheel and carrying at the opposite side of the pivot a platen or pressure-bar to press the ribbon against the type-wheels, substantially as described.

In testimony whereof I have signed my name to this specification, in the presence of two subscribing witnesses, on this 2d day of July, A. D. 1890.

JAMES F. GOODRIDGE.

Witnesses:
 ALBAN ANDRÉN,
 ALICE A. PERKINS.